US012810072B2

(12) United States Patent
Kim et al.

(10) Patent No.: US 12,810,072 B2
(45) **Date of Patent: *Nov. 24, 2026**

(54) METHOD AND DEVICE FOR REINFORCEMENT OF MULTIPLE CHOICE QA MODEL BASED ON ADVERSARIAL LEARNING TECHNIQUES

(71) Applicant: 42Maru Inc., Seoul (KR)

(72) Inventors: Dong Hwan Kim, Seoul (KR); Han Su Kim, Bucheon-si (KR); Woo Tae Jeong, Seongnam-si (KR); Ki Bong Sung, Seoul (KR); Hyeon Dey Kim, Bucheon-si (KR)

(73) Assignee: 42Maru Inc., Seoul (KR)

( * ) Notice: Subject to any disclaimer, the term of this patent is extended or adjusted under 35 U.S.C. 154(b) by 332 days.

This patent is subject to a terminal disclaimer.

(21) Appl. No.: 18/611,235

(22) Filed: Mar. 20, 2024

(65) Prior Publication Data

US 2024/0232531 A1 Jul. 11, 2024

Related U.S. Application Data

(63) Continuation of application No. 17/120,075, filed on Dec. 11, 2020, now Pat. No. 11,960,838.

(30) Foreign Application Priority Data

Dec. 3, 2020 (KR) ........................ 10-2020-0167224

(51) Int. Cl.

| | |
|---|---|
| ***G06F 40/279*** | (2020.01) |
| ***G06F 40/35*** | (2020.01) |
| ***G06N 3/08*** | (2023.01) |

(52) U.S. Cl.
CPC ............ *G06F 40/279* (2020.01); *G06F 40/35* (2020.01); *G06N 3/08* (2013.01)

(58) Field of Classification Search
CPC ......... G06F 40/279; G06F 40/35; G06N 3/08; G06N 3/045; G06N 3/0455; G06N 3/0475; G06N 3/084
See application file for complete search history.

(56) References Cited

U.S. PATENT DOCUMENTS

| | | | |
|---|---|---|---|
| 11,250,332 | B2 | 2/2022 | Akolkar et al. |
| 2015/0348433 | A1 | 12/2015 | Gatterbauer et al. |
| 2016/0293034 | A1 | 10/2016 | Agarwalla et al. |
| 2018/0373791 | A1 | 12/2018 | Yen et al. |

(Continued)

FOREIGN PATENT DOCUMENTS

| | | | | |
|---|---|---|---|---|
| KR | 10-2019-0059084 A | 5/2019 | | |
| WO | WO-2019067960 A1 * | 4/2019 | ............. | G06N 3/048 |

OTHER PUBLICATIONS

Alfredo Canziani, "Generative Adverarial Networks", Publisher: wayback machine, pp. 1-6 (Year: 2020).

(Continued)

*Primary Examiner* — Wilson W Tsui
(74) *Attorney, Agent, or Firm* — USX IP LLC

(57) ABSTRACT

The present invention relates to a method for reinforcing a multiple-choice QA model based on adversarial learning techniques, wherein incorrect answers are further generated based on a data set used in the process of training the multiple-choice QA model to enrich data which are learnable by the multiple-choice QA model.

9 Claims, 2 Drawing Sheets

(56) References Cited

U.S. PATENT DOCUMENTS

| | | | |
|---|---|---|---|
| 2020/0265735 A1 | 8/2020 | Byron et al. | |
| 2020/0388184 A1 | 12/2020 | Sarir et al. | |
| 2022/0147861 A1 * | 5/2022 | Oltramari | G06F 16/3329 |

OTHER PUBLICATIONS

Park, et al. "Korean Learning Assistant System with Automatically Extracted Knowledge." KIPS Transactions on Software and Data Engineering, vol. 1. No. 2. Nov. 2012. pp. 91-102. with English Abstract.

Liang et al., "Distractor Generation with Generative Adversarial Nets for Automatically Creating Fill in the blank Questions", published: 2017, pp. 1-4 (Year: 2017).

Mitchell Kinney, "Multiple Choice Question Answering using a Large Corpus of Information", published: Jul. 2020, pp. C1, C2, i-viii, and 1-110 (Year: 2020).

Bao, et al. "Question Generation With Doubly Adversarial Nets". IEEE/ACM Transactions on Audio. Speech. and Language Processing, vol. 26. No. 11. Nov. 1, 2018. pp. 2230-2239.

Barz., et al. "Incremental Improvement of a Question Answering System by Re-ranking Answer Candidates using Machine Learning". arxiv.org, arXiv: 1908.10149.Aug. 27, 2019.

Chao, et al. "Cross-Dataset Adaptation 1-11 for Visual Question Answering", 2018 1EEE/CVF Conference on Computer Vision and Pattern Recognition. IEEE, Jun. 18, 2018, pp. 5716-5725.

Extended European Search Report issued Aug. 4, 2021 for EP20213257. 12 pages.

Offerijns, et al. "Better Distractions: Transformer-based Distractor Generation and Multiple Choice Question Filtering". arxiv.org, arXiv:2010.09598, Oct. 19, 2020.

Office Action dated Sep. 29, 2022 in Korea Application No. 10-2020-0167224.

* cited by examiner

METHOD AND DEVICE FOR REINFORCEMENT OF MULTIPLE CHOICE QA MODEL BASED ON ADVERSARIAL LEARNING TECHNIQUES

CROSS-REFERENCE RELATED APPLICATIONS

This application is a Continuation Application of U.S. application Ser. No. 17/120,075, filed on Dec. 11, 2020, claiming priority to Korean Patent Application No. 10-2020-0167224, filed Dec. 3, 2020, the contents of each of which is incorporated by reference in their entireties.

BACKGROUND OF THE INVENTION

Field of the Invention

The present invention relates to a method and device for reinforcing a multiple-choice QA model based on adversarial learning techniques, and in more detail, a method and device for performing negative sampling on a multiple-choice QA question through an incorrect answer generation model to reinforce a process of training the multiple-choice QA model.

Description of the Related Art

MRC (Machine Reading Comprehension) and QA (Question Answering) is one of the fundamental tasks for natural language understanding. Due to the increased complexity of deep neural networks and the transfer of knowledge from the language models pre-trained on large-scale corpora, state-of-the-art QA models have achieved human-level performance. However, in the case of a multiple-choice question, the existing extraction-type question-answering system is less accurate and needs to improve performance.

SUMMARY OF THE INVENTION

The present invention is to solve the above-described problem, and an object of the present invention is to further generate an incorrect answer based on a data set used in a process of training a multiple-choice QA model to enrich data which can be learned by the multiple-choice QA model to reinforce the multiple-choice QA model.

The invention for achieving the object is a method for reinforcing a multiple-choice QA model using an incorrect answer test model, comprising: receiving a text and a question subordinate to the text from a user, the question includes choices for the question, and the choices include a first correct answer and a first incorrect answer; receiving a second incorrect answer suitable for a context of the text and the question from an incorrect answer generation model; adding the received second incorrect answer to the choices for the question; generating a second text vector, a second question vector, and choice vectors by encoding the text, the question, and the choices, respectively, the choice vectors include a first correct answer vector, a first incorrect answer vector, and a second incorrect answer vector corresponding to the first correct answer, the first incorrect answer, and the second incorrect answer, respectively; analyzing how appropriate the choice vectors are for the second text vector and the second question vector; calculating a first score for each of the choice vectors based on the analysis results; selecting a choice vector with the highest first score among the choice vectors as a second correct answer vector; generating a first feedback to train the incorrect answer test model and a second feedback to train the incorrect answer generation model by determining whether the first correct answer is identical to the second correct answer to prevent the incorrect answer generation model from overfitting; performing self-learning of the incorrect answer text model based on the first feedback; and transmitting the second feedback to the incorrect answer generation model.

Further, the invention is a device for reinforcing a multiple-choice QA model using an incorrect answer model, comprising: a memory storing instructions; and a processor configured to execute the instructions to: receive a text and a question subordinate to the text from a user, the question includes choices for the question, and the choices include a first correct answer and a first incorrect answer; receive a second incorrect answer suitable for a context of the text and the question from an incorrect answer generation model; add the received second incorrect answer to the choices for the question; generate a second text vector, a second question vector, and choice vectors by encoding the text, the question, and the choices, respectively, the choice vectors include a first correct answer vector, a first incorrect answer vector, and a second incorrect answer vector corresponding to the first correct answer, the first incorrect answer, and the second incorrect answer, respectively; analyze how appropriate the choice vectors are for the second text vector and the second question vector; calculate a first score for each of the choice vectors based on the analysis results; select a choice vector with the highest first score among the choice vectors as a second correct answer vector; generate a first feedback to train the incorrect answer test model and a second feedback to train the incorrect answer generation model by determining whether the first correct answer is identical to the second correct answer to prevent the incorrect answer generation model from overfitting; perform self-learning of the incorrect answer text model based on the first feedback; and transmit the second feedback to the incorrect answer generation model.

DETAILED DESCRIPTION OF THE PREFERRED EMBODIMENTS

Figure 1:
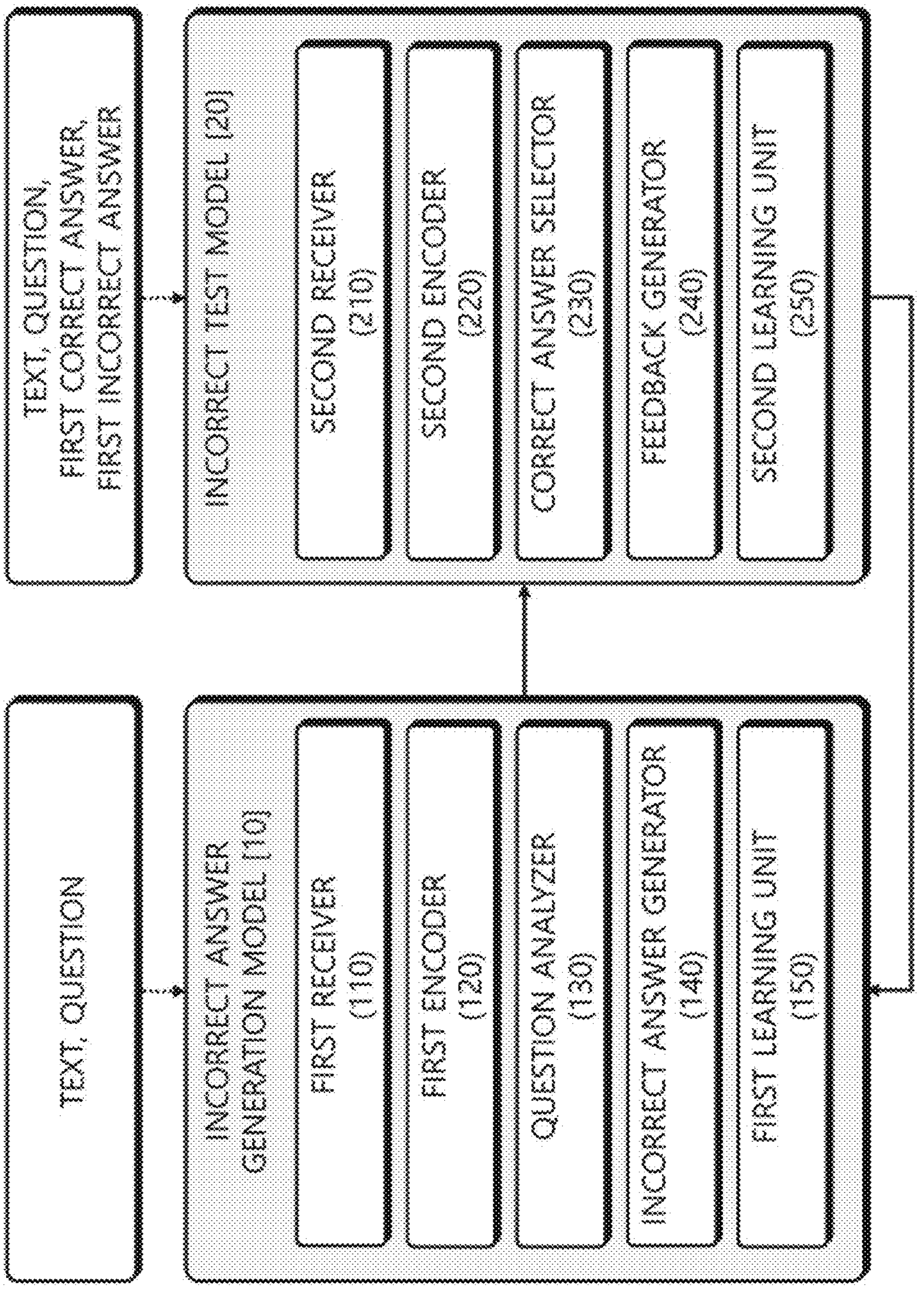
FIG. 1 is a block diagram illustrating a configuration of a system for reinforcing a multiple-choice QA model based on an adversarial learning technique according to an embodiment of the present invention.

The above-described objects, features, and advantages will be described in detail below with reference to the accompanying drawings, and accordingly, a person skilled in the art to which the present invention pertains can easily implement the technical spirit of the present invention. In describing the present invention, when it is determined that the detailed description of the known technology related to the present invention may unnecessarily obscure the gist of the present invention, the detailed description thereof will be omitted.

In the drawings, the same reference numerals are used to indicate the same or similar elements, and all combinations described in the specification and claims may be combined in any manner. It should be understood that reference to the singular may include more than one, and reference to the singular may also include the plural.

The terms used in this specification are for the purpose of describing specific exemplary embodiments only and are not intended to be limiting. Singular expressions as used herein may also be intended to include plural meanings unless clearly indicated otherwise in the corresponding sentence. The term "and/or" includes all combinations and any of the items listed in connection therewith. The terms "comprises", "comprising", "including", "having" and the like have inclusive meanings, and accordingly, these terms specify features, integers, steps, operations, elements, and/or components, and does not exclude the presence or addition of one or more other features, integers, steps, operations, elements, components, and/or groups thereof. The steps, processes, and operations of the method described herein should not be construed as necessarily performing their performance in the particular order discussed or illustrated, unless the order in which they are specifically performed is determined. It should also be understood that additional or alternative steps may be used.

In addition, each component may be implemented as a hardware processor, the above components may be integrated to be implemented as a single hardware processor, or the above components may be combined with each other to be implemented as a plurality of hardware processors.

Hereinafter, preferable embodiments of the present invention will be described in detail with reference to the accompanying drawings.

FIG. 1 is a block diagram illustrating a configuration of a system for reinforcing a multiple-choice QA model based on an adversarial learning technique according to an embodiment of the present invention.

Referring to FIG. 1, a system for reinforcing a multiple-choice QA model according to an embodiment of the present invention can enhance performance by self-learning.

Since artificial intelligence may make erroneous judgments due to weaknesses inherent in algorithms as machines are trained using artificial neural networks, a system for reinforcing a multiple-choice QA model according to an embodiment of the present invention may generate a training data set for training a multiple-choice QA model through an adversarial learning technique.

In general, when there are 4 choices for a question and when there are 10 choices, the difficulty of the question is higher. Accordingly, the system for reinforcing a multiple-choice QA model according to the present invention may increase the number of incorrect answers to be added to the training data set of the multiple-choice QA model to enriching choices, thereby strongly training the multiple-choice QA model.

The system for reinforcing a multiple-choice QA model according to an embodiment of the present invention may, in generating the data set required in the process of training the multiple-choice QA model, construct and simultaneously train not only an incorrect answer generation model 10 but also an incorrect answer test model 20 by considering the characteristics of artificial intelligence that selects the easiest and fastest method in solving a question to improve the quality of the incorrect answer, and based on this, reinforce the multiple-choice QA model.

The incorrect answer generation model 10 according to an embodiment of the present invention may be a device configured to obtain a text based on natural language text and a question from a user, analyze the text and the question, and generate a second incorrect answer based on the context.

The incorrect answer generation model 10 may transmit the generated second incorrect answer to the incorrect answer test model 20, receive feedback for the second incorrect answer from the incorrect answer test model 20, and generate an optimal second incorrect answer through self-learning.

The incorrect answer test model 20 may obtain a text based on natural language text, a question, and a first correct answer (actual correct answer) and a first incorrect answer (actual incorrect answer) for the question, obtain a second incorrect answer generated from the incorrect answer generation model 10, and select a second correct answer from among the first correct answer, the first incorrect answer, and the second incorrect answer by using the text, the question, the first correct answer, the first incorrect answer, and the second incorrect answer as input data. In this case, when the incorrect answer test model 20 selects the second correct answer, the first correct answer, the first incorrect answer, and the second incorrect answer are not distinguished from each other and may simply exist as choices.

The incorrect answer test model 20 may transmit feedback to the incorrect answer generation model 10 based on a result value derived when selecting the second correct answer.

Hereinafter, the incorrect answer generation model 10 and the incorrect answer test model 20 will be described in more detail.

Incorrect Answer Generation Model 10

The incorrect answer generation model 10 is based on a transformer architecture, and may use an SEQ2SEQ model. The incorrect answer generation model 10 is composed of 6 to 24 transformer layers, and each layer may generate a second incorrect answer based on the context of the text and the question received from the user using a linear Softmax classifier at each layer. More specifically, the incorrect answer generation model may include a first receiver 110, a first encoder 120, a question analyzer 130, an incorrect answer generator 140, and a first learning unit 150.

The first receiver 110 may receive a text and a question from a user. The text will have a form of Passage or Dialogue, and the question will be subordinate to the text. The text and the question may be identified by a segment ID.

The first encoder 120 may generate a first text vector and a first question vector by individually encoding the text and the question. The first encoder 120 may be composed of a plurality of encoders and allocated to data processing of the text and question, respectively. Alternatively, the first encoder 120 may be composed of one encoder and allocated to the entire text and question. The first encoder 120 may encode the text and the question in units of morpheme.

The question analyzer 130 may analyze the first question vector based on the first text vector and the first question vector. The question analyzer 130 may use a linear Softmax classifier to analyze the first question vector, and may use known algorithms such as morpheme analysis, syntax analysis, and vocabulary meaning analysis.

The incorrect answer generator 140 may generate an incorrect answer suitable for the context of the text and the question based on the first text vector and the first question vector analyzed by the question analyzer 130.

The first learning unit 150 may train the incorrect answer generator 140 so as to deceive the incorrect answer test model 20 in generating the incorrect answer. More specifically, the first learning unit 150 may train the incorrect answer generator 140 based on a second feedback received from the incorrect answer test model 20.

The first learning unit 150 may improve the performance of the incorrect answer generator 140 by using a cross entropy function. The first learning unit 150 may perform learning to 1) calculate a loss of the incorrect answer generation model 10 based on the text and the question received by the first receiver 110, a first incorrect answer corresponding thereto, and a second incorrect answer generated by the incorrect answer generator 140 and minimize the loss, and 2) calculate a loss of the incorrect answer generation model 10 based on the second feedback received from the incorrect answer test model 20 maximize the loss.

$$\mathrm{Loss}_G = \min\max V(D, G) = \log D(x) + \log(1 - D(G(\mathrm{input}))) \quad \text{[Equation 1]}$$

Incorrect Answer Test Model 20

The incorrect answer test model 20 according to an embodiment of the present invention is based on a transformer architecture, and forms a linear layer at the top layer to determine which of the two is the actual correct answer (the second correct answer) based on a second incorrect answer generated from the incorrect answer generation model 10, and the first correct answer, which is the actual correct answer, and the first incorrect answer, which is the actual incorrect answer, for the text and the question received from a user. More specifically, the incorrect answer test model may include a second receiver 210, a second encoder 220, a correct answer selector 230, a feedback generator 240, and a second learning unit 250.

The second receiver 210 may receive a text, a question, and a first correct answer and a first incorrect answer corresponding to the text and the question from the user. In addition, the second receiver 210 may further receive a second incorrect answer generated by the incorrect answer generation model 10 and set the second incorrect answer as a choice for the question.

The text and the question received from the user in the second receiver 210 are identical to the text and the question received from the user by the first receiver 110 of the incorrect answer generation model 10.

The second encoder 220 individually encodes the text, the question, the first correct answer, the first incorrect answer, and the second incorrect answer to generate a second text vector, a second question vector, a first correct answer vector, a first incorrect answer vector, and a second incorrect answer vector. The second encoder may be composed of a plurality of encoders and allocated to data processing of the text, the question, the first correct answer, the first incorrect answer, and the second incorrect answer, respectively. Alternatively, the second encoder may be composed of one encoder and allocated to the whole data received. The second encoder 220 may encode data in units of morphemes when encoding the data.

The correct answer selector 230 may select a second correct answer based on the second text vector, the second question vector, the first correct answer vector, the first incorrect answer vector, and the second incorrect answer vector generated by the second encoder 220. Hereinafter, in the description of the incorrect answer test model 20, the first correct answer vector, the first incorrect answer vector, and the second incorrect answer vector are collectively referred to as a choice vector for intuitive understanding.

The correct answer selector 230 may select the second correct answer vector most suitable for the question from among the choice vectors including the first correct answer vector, the first incorrect answer vector, and the second incorrect answer vector. Specifically, the correct answer selector 230 may analyze how appropriate the choice vectors are for the second text vector and the second question vector and calculate a first score for each of the choice vectors according to a result of analysis. The correct answer selector 230 may analyze how appropriate the choices are for the text and the question by calculating a contextual correlation in the process of analysis. The correct answer selector 230 may use a conventional method to calculate the correlation.

The correct answer selector 230 may set the range of the first score to a range of −10 to 10, which may be changed according to settings. The correct answer selector 230 may calculate the first score as 10 points when the choice vector has a high correlation with the second text vector and the second question vector, and calculate the first score as −10 points when the choice vector has a low correlation.

The correct answer selector 230 may rank the first scores for the choice vectors, and select one choice vector having the highest first score among the ranked first scores as a second correct answer vector.

For example, when one content of the text is "Miseon sent a text to Cheolsu.—Cheolsu, it's Mother's Day today, are you not coming home?—", the question is "What is the relationship between Miseon and Cheolsu?", and choices are 1. Father, 2. Mother, 3. School friend, 4. Homeroom teacher, the correct answer selector 230 may calculate 7 points for the first score of choice 1, 9 points for the first score of choice 2, −8 points for the first score of choice 3, and −3 points for the first score of choice 4. The correct answer selector 230 may identify the gender of Miseon for choice 1 and choice 2 and calculate a first score. The correct answer selector 230 may rank the first scores (choice vector 2, choice vector 1, choice vector 4, choice vector 3) and select the choice vector 2 having the highest first score as the second correct answer vector.

The feedback generator 240 may determine whether the second correct answer vector selected by the correct answer selector 230 is identical to the first correct answer vector. When the first correct answer vector is identical to the second correct answer vector, the feedback generator 240 may generate a positive first feedback to be transmitted to the second learning unit 250, and generate a negative second feedback to be transmitted to the incorrect answer generation model 10. This is because an incorrect answer generated by the incorrect answer generation model 10 is not well made if the incorrect answer test model 20 gets the correct answer.

The second learning unit 250 may train the incorrect answer test model 20 based on the first feedback received from the feedback generator 240. The second learning unit 250 may perform learning such that the correct answer selector 230 selects a second correct answer vector that is identical to the first correct answer vector.

The second learning unit 250 may improve the performance of the correct answer selector 230 by using a cross entropy function. The second learning unit 250 may calculate a loss of the incorrect answer test model 20 based on the first correct answer received from the second receiver 210 and the second correct answer selected by the correct answer selector 230 and perform learning to maximize it.

$$\mathrm{Loss}_D = \max(\log(1 - D(G(\mathrm{input}))) \quad \text{[Equation 2]}$$

BIAS Solution

The system for reinforcing a multiple-choice QA model according to an embodiment of the present invention has a task to solve the problem that the incorrect answer generation model 10 is overfitting in a training process. When the incorrect answer generation model 10 is overfitting, an incorrect answer is generated in a direction to deceive the incorrect answer test model 20. Specifically, an incorrect answer similar to the correct answer is generated such that the incorrect answer test model 20 has difficulties in smoothly selecting the correct answer.

In order to solve this problem, the device for reinforcing a multiple-choice QA model according to an embodiment of the present invention may cause the second learning unit 250 of the incorrect answer test model 20 to perform learning by adjusting weights such that a first score of the second incorrect answer vector generated by the incorrect answer generation model 10 has an intermediate value between a first score of the first correct answer vector and a first score of the first incorrect answer.

As another method for solving the problem, the system for reinforcing a multiple-choice QA model according to another embodiment of the present invention may further construct another incorrect answer test model 20 which compares the second incorrect answer generated by the incorrect answer generation model 10 with an actual correct answer (the first correct answer), calculates the similarity therebetween, and transmits a negative feedback to the incorrect answer generation model 10 when the similarity is greater than or equal to a preset threshold. Through this, the incorrect answer generation model 10 will be trained to generate a second incorrect answer that is not very similar to the correct answer. In this case, the additional incorrect answer test model 20 may use an existing model such as TFIDF to calculate the similarity between the second incorrect answer vector and the first correct answer vector.

Figure 2:
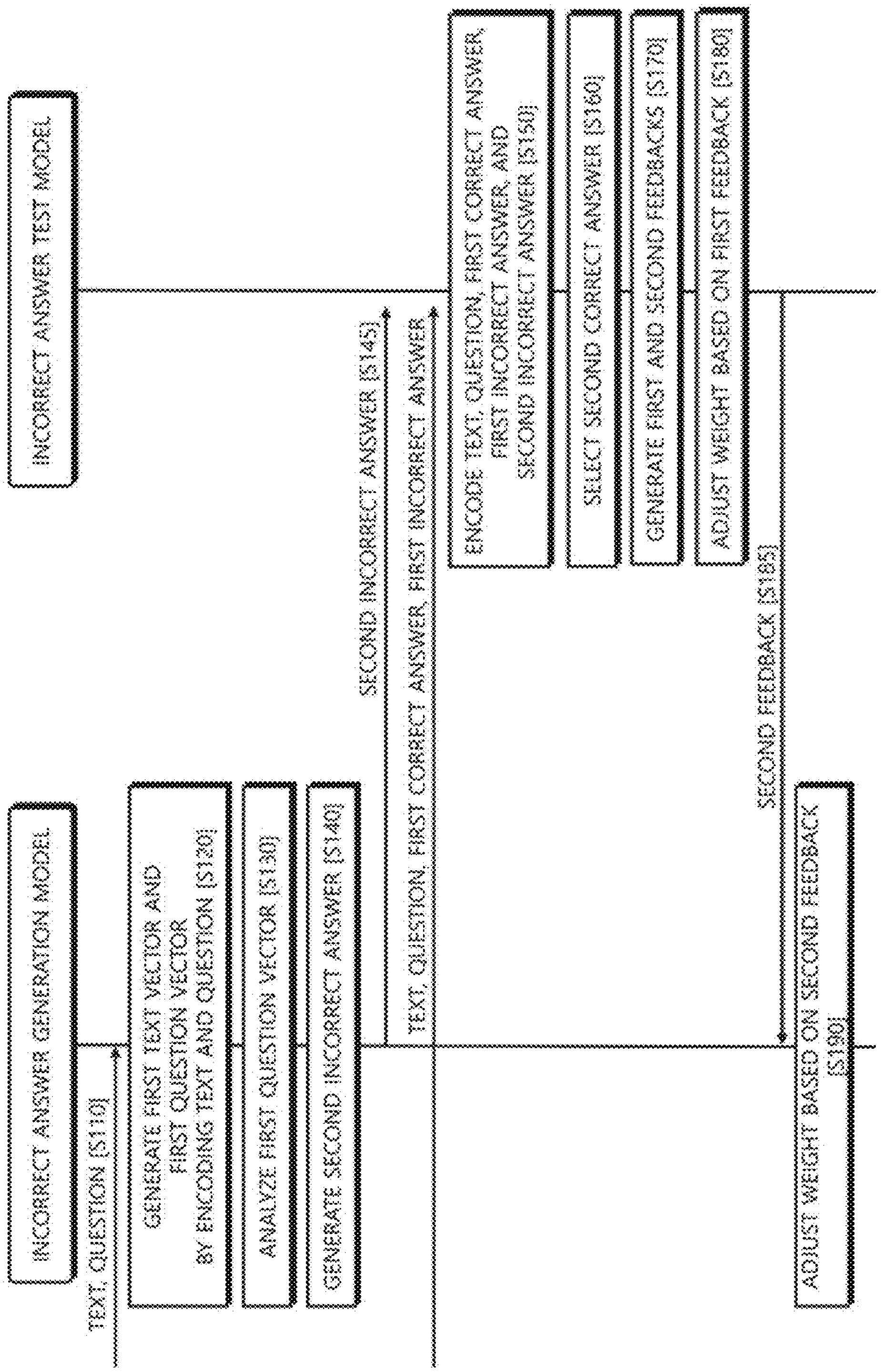
FIG. 2 is a flow chart for describing a method for reinforcing a multiple-choice QA model based on adversarial learning techniques according to an embodiment of the present invention.

FIG. 2 is a flow chart for describing a method for reinforcing a multiple-choice QA model based on an adversarial learning technique according to an embodiment of the present invention. Hereinafter, a method for reinforcing a multiple-choice QA model according to an embodiment of the present invention is described with reference to FIG. 2. In the related description, detailed embodiments overlapping with the aforementioned system for reinforcing a multiple-choice QA model may be omitted.

The method for reinforcing a multiple-choice QA model of the present invention will be operated by an incorrect answer generation model that generates an incorrect answer and an incorrect answer test model that verifies the incorrect answer generated by the incorrect answer generation model to expand the incorrect answer of a data set for training the multiple-choice QA model.

The incorrect answer generation model 10 may receive a text and a question from a user (S110). The text will have a form of Passage or Dialogue, and the question will be subordinate to the text. The text and the question may be identified by a segment ID.

The incorrect answer generation model 10 may generate a first text vector and a first question vector by individually encoding the text and the question (S120). The incorrect answer generation model 10 may encode the text and the question in units of morpheme.

The incorrect answer generation model 10 may analyze a first question vector based on the first text vector and the first question vector (S130). The incorrect answer generation model 10 may use a linear Softmax classifier to analyze the first question vector, and may use known algorithms such as morpheme analysis, syntax analysis, and vocabulary meaning analysis.

The incorrect answer generation model 10 may generate a second incorrect answer suitable for the context of the text and the question based on the first text vector and the analyzed first question vector (S140).

The incorrect answer generation model 10 may transmit the generated second incorrect answer to the incorrect answer test model 20 (S145).

When receiving the text, the question, the first correct answer and the first incorrect answer from the user and the second incorrect answer from the incorrect answer generation model 10, the incorrect answer test model 20 may individually encode the text, the question, the first correct answer, the first incorrect answer, and the second incorrect answer to generate a second text vector, a second question vector, a first correct answer vector, a first incorrect answer vector, and a second incorrect answer vector (S150). The incorrect answer test model 20 may encode data in units of morphemes when encoding the data.

The incorrect answer test model 20 may select a second correct answer based on the second text vector, the second question vector, the first correct answer vector, the first incorrect answer vector, and the second incorrect answer vector (S160). Hereinafter, in the description of the incorrect answer test model 20, the first correct answer vector, the first incorrect answer vector, and the second incorrect answer vector are collectively referred to as a choice vector for intuitive understanding.

When specifically describing step 160, the incorrect answer test model 20 may select a second correct answer vector most suitable for the question from among the choice vectors including the first correct answer vector, the first incorrect answer vector, and the second incorrect answer vector. Specifically, the incorrect answer test model 20 may analyze how appropriate the choice vectors are for the second text vector and the second question vector, and calculate a first score for each of the choice vectors according to a result of analysis. In the analysis process, the incorrect answer test model 20 may analyze how appropriate the choices are for the text and the question by calculating a contextual correlation in the process of analysis. The incorrect answer test model 20 may use a conventional method to calculate the correlation.

The incorrect answer test model 20 may set the range of the first score to a range of −10 to 10, which may be changed according to settings. The incorrect answer test model 20 may calculate the first score as 10 points when the choice vector has a high correlation with the second text vector and the second question vector, and calculate the first score as −10 points when the choice vector has a low correlation.

The incorrect answer test model 20 may select one choice vector having the highest first score as the second correct answer vector.

The incorrect answer test model 20 may determine whether the second correct answer vector is identical to the first correct answer vector, and generate first and second feedbacks (S170). When the first correct answer vector is identical to the second correct answer vector, the incorrect answer test model 20 may generate a positive first feedback for self-learning, and generate a negative second feedback to be transmitted to the incorrect answer generation model 10. This is because an incorrect answer generated by the incorrect answer generation model 10 is not well made if the incorrect answer test model 20 gets the correct answer.

In selecting the second correct answer based on the first feedback, the incorrect answer test model 20 may adjust a weight to enhance performance (S180). The incorrect answer test model 20 may be trained to select a second correct answer vector that is identical to the first correct answer vector.

When the incorrect answer test model 20 transmits the second feedback to the incorrect answer generation model 10 (S185), the incorrect answer generation model 10 may adjust the weight in generating the second incorrect answer based on the second feedback to improve performance (S190).

Meanwhile, the incorrect answer test model 20 may further perform learning by adjusting weights such that a first score of the second incorrect answer vector generated by the incorrect answer generation model 10 has an intermediate value between a first score of the first correct answer vector and a first score of the first incorrect answer in order to prevent the incorrect answer generation model 10 from overfitting.

As described above, the system for reinforcing a multiple-choice QA model according to an embodiment of the present invention is characterized by generating more incorrect answers among the training data sets of the multiple-choice QA model, so that the generated training data set can be further used to evaluate existing multiple-choice QA models.

According to the present invention as described above, it is possible to enrich the data that can be learned by the multiple-choice QA model by generating more incorrect answers based on a data set used in the process of training the multiple-choice QA model, thus reinforcing a multiple-choice QA model. The multiple-choice QA model trained through the present invention can be further utilized to improve the performance of a search engine.

The embodiments of the present invention disclosed in the present specification and drawings are provided only to provide specific examples to easily describe the technical contents of the present invention and to aid understanding of the present invention, and are not intended to limit the scope of the present invention. It is obvious to those of ordinary skill in the art that other modifications based on the technical idea of the invention can be implemented in addition to the embodiments disclosed therein.

What is claimed is:

1. A method for reinforcing a multiple-choice QA model using an incorrect answer test model, the method comprising:

receiving a text and a question subordinate to the text from a user, wherein the question includes choices for the question, and the choices include a first correct answer and a first incorrect answer;

receiving, from an incorrect answer generation model, a second incorrect answer that is suitable for a context of the text and the question and generated by the incorrect answer generation model;

adding the received second incorrect answer to the choices for the question;

generating a second text vector, a second question vector, and choice vectors by encoding the text, the question, and the choices, respectively, using one or more encoders of the incorrect answer test model, wherein the choice vectors include a first correct answer vector, a first incorrect answer vector, and a second incorrect answer vector corresponding to the first correct answer, the first incorrect answer, and the second incorrect answer, respectively;

analyzing a contextual correlation of each of the choice vectors with the second text vector and the second question vector;

calculating a first score for each of the choice vectors based on the analysis-results contextual correlation;

selecting a choice vector with the highest first score among the choice vectors as a second correct answer vector;

generating a first feedback to train the incorrect answer test model and a second feedback to train the incorrect answer generation model by determining whether the first correct answer vector is identical to the second correct answer vector to prevent the incorrect answer generation model from overfitting, wherein the generating of the first feedback and the second feedback comprises (i) calculating a first similarity between the second incorrect answer vector and the first correct answer vector, and (ii) generating, as the second feedback, a negative second feedback when the first similarity is greater than or equal to a preset threshold;

training the incorrect answer test model based on the first feedback by adjusting weights of the incorrect answer test model such that the incorrect answer test model selects a second correct answer vector identical to the first correct answer vector; and transmitting the second feedback to the incorrect answer generation model, wherein the transmitting of the negative second feedback to the incorrect answer generation model causes the incorrect answer generation model to adjust weights of the incorrect answer generation model so that a second similarity between (A) a vector corresponding to a subsequent second incorrect answer generated by the incorrect answer generation model based on the adjusted weights of the incorrect answer generation model and (B) the first correct answer vector is less than the preset threshold, wherein the incorrect answer test model is based on a transformer architecture and includes a linear layer at a top layer of the incorrect answer test model, and wherein a correct answer selector of the incorrect answer test model uses the linear layer to select the second correct answer vector based on the second text vector, the second question vector, and the choice vectors.

2. The method of claim 1, wherein the generating the first feedback to train the incorrect answer test model and the second feedback to train the incorrect answer generation model, includes: when the first correct answer vector is not identical to the second correct answer vector, generating a negative first feedback and generating a positive second feedback.

3. The method of claim 1, wherein the generating the first feedback to train the incorrect answer test model and the second feedback to train the incorrect answer generation model, includes:

when the first correct answer vector is identical to the second correct answer vector, generating a positive first feedback and generating a negative second feedback.

4. The method of claim 1, wherein the training of the incorrect answer test model based on the first feedback includes:

adjusting the weights of the incorrect answer test model to maximize a loss of a cross entropy function based on the first feedback so that the incorrect answer test model selects the second correct answer vector that is identical to the first correct answer vector.

5. The method of claim 1, wherein the training of the incorrect answer test model based on the first feedback, includes:

adjusting the weights of the incorrect answer test model such that the first score of the second incorrect answer vector has an intermediate value between the first score of the first correct answer vector and the first score of the first incorrect answer vector.

6. The method of claim 1, further comprising:

generating, by the incorrect answer generation model, a first text vector and a first question vector by encoding the text and the question, respectively; and analyzing, by the incorrect answer generation model, the first question vector;

generating, by the incorrect answer generation model, an incorrect answer vector based on the first text vector and the analyzed first question vector; and transmitting, by the incorrect answer generation model, the second incorrect answer obtained by decoding the second incorrect answer vector to the incorrect answer test model.

7. The method of claim 1, further comprising:

adjusting, by the incorrect answer generation model, the weights of the incorrect answer generation model to minimize a loss of a cross entropy function based on the second feedback so that the incorrect answer generation model generates a better second incorrect answer.

8. A device for reinforcing a multiple-choice QA model using an incorrect answer test model, comprising:

a memory storing instructions; and a processor configured to execute the instructions to:

receive a text and a question subordinate to the text from a user, wherein the question includes choices for the question, and the choices include a first correct answer and a first incorrect answer;

receive, from an incorrect answer generation model, a second incorrect answer that is suitable for a context of the text and the question and generated by the incorrect answer generation model;

add the received second incorrect answer to the choices for the question;

generate a second text vector, a second question vector, and choice vectors by encoding the text, the question, and the choices, respectively, using one or more encoders of the incorrect answer test model, wherein the choice vectors include a first correct answer vector, a first incorrect answer vector, and a second incorrect answer vector corresponding to the first correct answer, the first incorrect answer, and the second incorrect answer, respectively;

analyze a contextual correlation of each of the choice vectors with the second text vector and the second question vector;

calculate a first score for each of the choice vectors based on the analysis-results contextual correlation;

select a choice vector with the highest first score among the choice vectors as a second correct answer vector;

generate a first feedback to train the incorrect answer test model and a second feedback to train the incorrect answer generation model by determining whether the first correct answer vector is identical to the second correct answer vector to prevent the incorrect answer generation model from overfitting, wherein the generating of the first feedback and the second feedback comprises (i) calculating a first similarity between the second incorrect answer vector and the first correct answer vector, and (ii) generating, as the second feedback, a negative second feedback when the first similarity is greater than or equal to a preset threshold;

train the incorrect answer text test model based on the first feedback by adjusting weights of the incorrect answer test model such that the incorrect answer test model selects a second correct answer vector identical to the first correct answer vector; and transmit the second feedback to the incorrect answer generation model, wherein the transmitting of the negative second feedback to the incorrect answer generation model causes the incorrect answer generation model to adjust weights of the incorrect answer generation model so that a second similarity between (A) a vector corresponding to a subsequent second incorrect answer generated by the incorrect answer generation model based on the adjusted weights of the incorrect answer generation model and (B) the first correct answer vector is less than the preset threshold, wherein the incorrect answer test model is based on a transformer architecture and includes a linear layer at a top layer of the incorrect answer test model, and wherein a correct answer selector of the incorrect answer test model uses the linear layer to select the second correct answer vector based on the second text vector, the second question vector, and the choice vectors.

9. A non-transitory computer-readable recording medium containing instructions for causing a computer to execute a method according to claim 1.

* * * * *